United States Patent
Milewski et al.

(10) Patent No.: US 10,214,366 B2
(45) Date of Patent: Feb. 26, 2019

(54) DROP BATCH BUILDER TECHNOLOGY

(71) Applicant: Cardinal IG Company, Eden Prairie, MN (US)

(72) Inventors: Michael J. Milewski, Poynette, WI (US); Robert C. Buchanan, Spring Green, WI (US); Jonathan D. Wyman, Spring Green, WI (US)

(73) Assignee: Cardinal IG Company, Eden Prairie, MN (US)

( * ) Notice: Subject to any disclaimer, the term of this patent is extended or adjusted under 35 U.S.C. 154(b) by 63 days.

(21) Appl. No.: 15/483,467

(22) Filed: Apr. 10, 2017

(65) Prior Publication Data

US 2018/0290842 A1  Oct. 11, 2018

(51) Int. Cl.
  *B65G 49/06*  (2006.01)
  *B65G 15/12*  (2006.01)
  *B65G 47/54*  (2006.01)

(52) U.S. Cl.
  CPC .......... *B65G 49/064* (2013.01); *B65G 15/12* (2013.01); *B65G 47/54* (2013.01); *B65G 49/06* (2013.01); *B65G 2201/022* (2013.01)

(58) Field of Classification Search
  CPC ...... B65G 15/12; B65G 47/08; B65G 47/082; B65G 47/084; B65G 47/086; B65G 47/26; B65G 47/28; B65G 47/30; B65G 47/54; B65G 49/064; B65G 49/06; B65G 2201/022; C03B 2225/02
  See application file for complete search history.

(56) References Cited

U.S. PATENT DOCUMENTS

| | | |
|---|---|---|
| 3,075,327 A | 1/1963 | Kimble et al. |
| 3,247,981 A | 4/1966 | Johnson |
| 3,493,095 A | 2/1970 | Messerly |
| 3,680,677 A | 8/1972 | Branch et al. |
| 3,701,408 A | 10/1972 | Northsea |
| 3,774,783 A | 11/1973 | Dean et al. |
| 3,910,425 A | 10/1975 | Mahara et al. |

(Continued)

FOREIGN PATENT DOCUMENTS

| | | |
|---|---|---|
| DE | 2728016 A1 | 1/1979 |
| WO | 2009113160 A1 | 9/2009 |

OTHER PUBLICATIONS

"Automatic Batching for Tempering," Ashton Industrial Sales, retrieved from <http://www.ashton-industrial.com/?page_id=79> on Apr. 24, 2017, 4 pages.

(Continued)

*Primary Examiner* — Gene O Crawford
*Assistant Examiner* — Keith R Campbell
(74) *Attorney, Agent, or Firm* — Fredrikson & Byron, P.A.

(57) ABSTRACT

A drop batch builder is provided for organizing a plurality of glass sheets into a desired batch arrangement on a conveyor. The drop batch builder includes an upper conveyor line and a lower conveyor line. The upper conveyor has a drop region configured to drop a first glass sheet from the upper conveyor line downwardly onto the lower conveyor line, whereupon the lower conveyor line is configured to convey the first glass sheet along the lower path of substrate travel to the overpass region where the first glass sheet is positioned under the upper conveyor line. Methods of using a drop batch builder are also provided.

39 Claims, 10 Drawing Sheets

(56) References Cited

U.S. PATENT DOCUMENTS

| | | | |
|---|---|---|---|
| 3,921,789 | A | 11/1975 | Goldinger et al. |
| 4,161,368 | A | 7/1979 | Batzdorff |
| 4,401,204 | A * | 8/1983 | Roseman ............. B65G 49/064 |
| | | | 198/358 |
| 4,976,766 | A | 12/1990 | Kuster et al. |
| 5,238,100 | A | 8/1993 | Rose et al. |
| 5,564,264 | A | 10/1996 | DeCrane |
| 5,927,469 | A | 7/1999 | Dunifon et al. |
| 6,343,685 | B1 | 2/2002 | Hofer |
| 6,419,075 | B1 | 7/2002 | Ramirez-Martinez et al. |
| 6,494,306 | B1 | 12/2002 | Hollander |
| 6,681,916 | B2 | 1/2004 | Hiroki |
| 6,898,833 | B2 | 5/2005 | Ashton |
| 6,938,751 | B1 | 9/2005 | Eubanks et al. |
| 7,178,659 | B2 | 2/2007 | Evans et al. |
| 7,631,744 | B2 | 12/2009 | Brommer et al. |
| 8,167,120 | B2 | 5/2012 | Russell et al. |
| 9,260,246 | B2 | 2/2016 | Nishimura et al. |
| 9,469,486 | B2 | 10/2016 | German |
| 9,475,653 | B2 | 10/2016 | Dugat |
| 2003/0168313 | A1 | 9/2003 | Hiroki |
| 2007/0017780 | A1 * | 1/2007 | Faucher ............. B65G 47/2445 |
| | | | 198/456 |
| 2008/0009229 | A1 * | 1/2008 | Sandri ................. B65G 49/064 |
| | | | 451/64 |
| 2014/0277700 | A1 | 9/2014 | Maglaty |
| 2016/0362260 | A1 * | 12/2016 | Itoh ........................ B65G 47/54 |
| 2018/0141754 | A1 * | 5/2018 | Garrett ................. B65G 1/1373 |

OTHER PUBLICATIONS

"Pretempering Machinery," Ashton Industrial Sales, retrieved from <http://www.ashton-industrial.com/?page_id=1329> on Apr. 24, 2017, 2 pages.

"SEAMMAXX-PRO (TM)," Ashton Industrial Sales, retrieved from <http://www.ashton-industrial.com/?page_id=80> on Apr. 24, 2017, 2 pages.

"SHAPESEAM-PRO (TM)," Ashton Industrial Sales, retrieved from <http://www.ashton-industrial.com/?page_id=1931> on Apr. 24, 2017, 3 pages.

European Patent Application No. 18166534.0, Extended European Search Report dated Sep. 17, 2018, 8 pages.

* cited by examiner

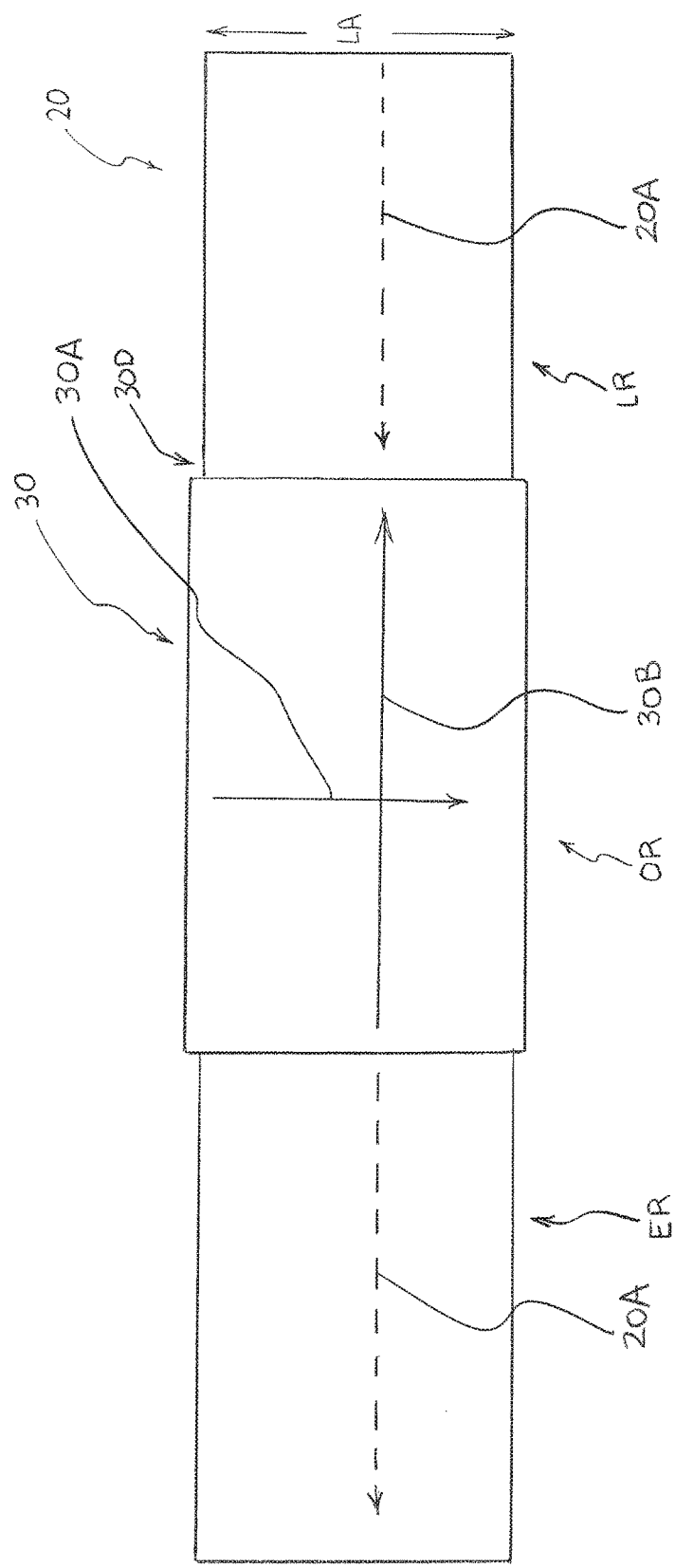

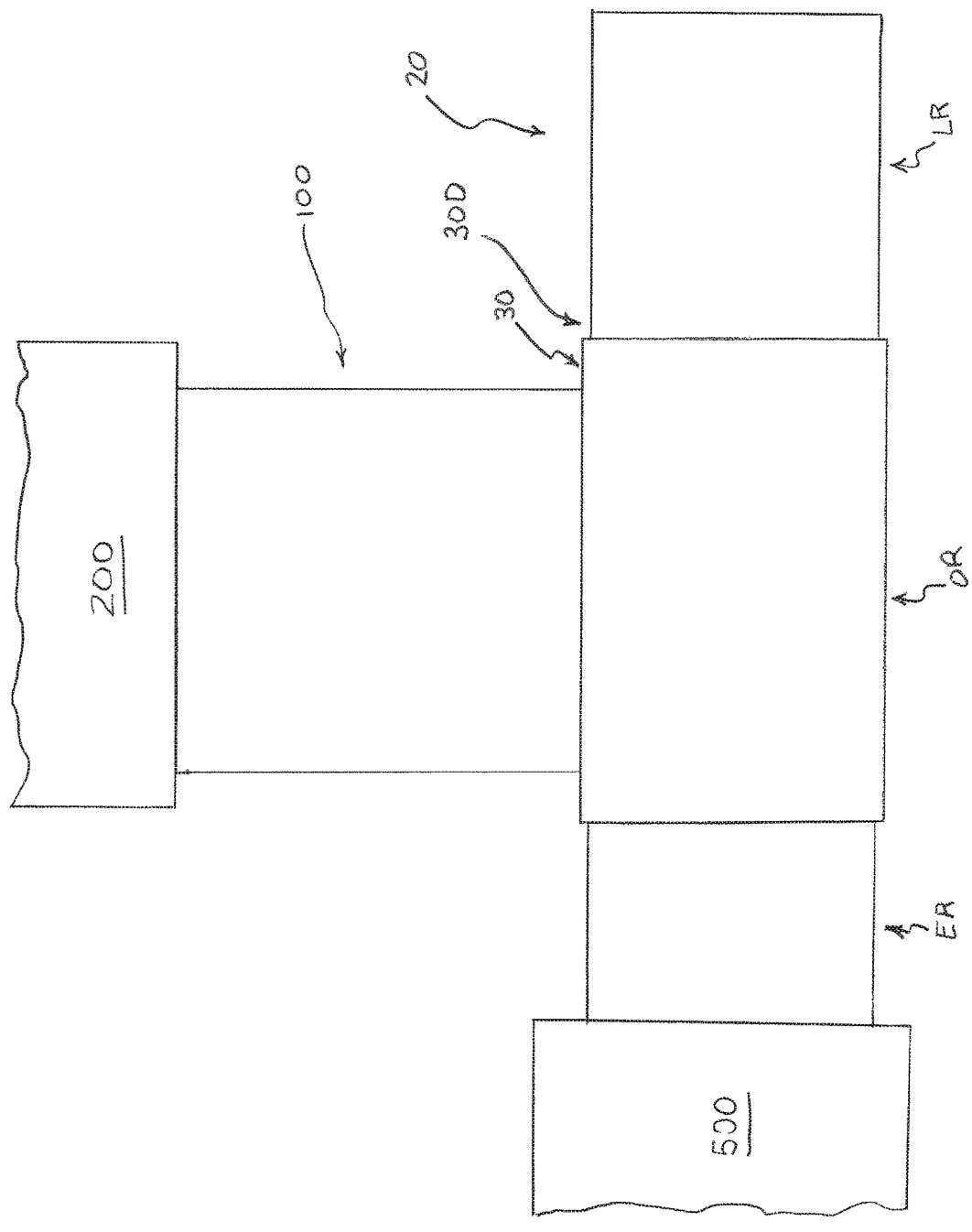

DROP BATCH BUILDER TECHNOLOGY

TECHNICAL FIELD

This disclosure relates to equipment and methods for handling glass sheets.

BACKGROUND

Glass sheets are often conveyed along conveyor lines in manufacturing facilities. In some applications, it is desirable to organize a plurality of glass sheets into a batch arrangement on a conveyor line. This has traditionally been done manually, e.g., by workers physically picking-up different sets of glass sheets and placing them on the conveyor line in different batch arrangements.

One such application involves organizing glass sheets into batch arrangements on a conveyor that delivers the glass sheets to a tempering furnace. In many cases, it is advantageous to organize glass sheets of different size, shape, or both into a single batch. This is common, for example, in made-to-order ("MTO") production. In MTO production, it may be desirable to process the glass sheets in a particular order. When glass sheets of different size and/or shape are arranged together into a batch on a conveyor, it can be advantageous to position them in an arrangement that fills a large percentage of the available conveyor area. This can be desirable for increasing throughput and efficiency. Since the sizes and shapes of glass sheets tempered in a single batch can vary extensively, there are many different arrangements into which different sets of glass sheets can be organized. The arrangement process can, in fact, be like a geometric puzzle game.

The same is true of other processing operations that involve organizing different sets of glass sheets into different batch arrangements on a conveyor.

It would be desirable to provide equipment and methods for organizing a plurality of glass sheets into a batch arrangement on a conveyor.

SUMMARY

In certain embodiments, the invention provides a drop batch builder comprising an upper conveyor line and a lower conveyor line. The upper conveyor line is configured to convey glass sheets along a first upper path of substrate travel. The upper conveyor line is also configured to convey glass sheets along a second upper path of substrate travel. The first and second upper paths of substrate travel are crosswise to each other, and each preferably is generally horizontal. The lower conveyor line is configured to convey glass sheets along a lower path of substrate travel. The lower path of substrate travel is crosswise to the first upper path of substrate travel. The upper conveyor line is at a higher elevation than the lower conveyor line. The lower conveyor line passes under the upper conveyor line at an overpass region. The upper conveyor has a drop region configured to drop a glass sheet from the upper conveyor line downwardly onto the lower conveyor line, whereupon the lower conveyor line is configured to convey such dropped glass sheet along the lower path of substrate travel to the overpass region where such dropped glass sheet is positioned under the upper conveyor line.

In other embodiments, the invention provides a method of using a drop batch builder. The drop batch builder includes an upper conveyor line and a lower conveyor line. The upper conveyor line is at a higher elevation than the lower conveyor line. The lower conveyor line passes under the upper conveyor line at an overpass region. In the present embodiments, the method involves operating the upper conveyor line to convey a first glass sheet along a first upper path of substrate travel, and thereafter operating the upper conveyor line to convey the first glass sheet along a second upper path of substrate travel. These first and second upper paths of substrate travel are crosswise to each other. The first glass sheet is conveyed along the second upper path of substrate travel until reaching a drop region of the upper conveyor line, whereupon the first glass sheet is dropped from the upper conveyor line downwardly onto the lower conveyor line.

The details of one or more examples are set forth in the accompanying drawings and the description below. Other features, objects, and advantages will be apparent to skilled artisans given the present descriptions, drawings, and claims.

BRIEF DESCRIPTION OF DRAWINGS

FIG. 9 is a schematic plan view of a drop batch builder in accordance with certain embodiments of the invention.

FIG. 10 is a schematic plan view of a drop batch builder, an upstream processing station, and a downstream processing station in accordance with certain embodiments of the invention.

DETAILED DESCRIPTION

The invention provides a station (e.g., a system comprising machinery) 10 that can be operated to arrange a plurality of glass sheets into a desired batch arrangement. The station 10 is referred to herein as a drop batch builder. It is configured to perform an automated process in which a plurality of glass sheets are positioned in a desired batch arrangement on a conveyor. Once the glass sheets are so arranged, the conveyor can be operated to deliver them to a tempering furnace or another downstream processing station.

Figure 1:
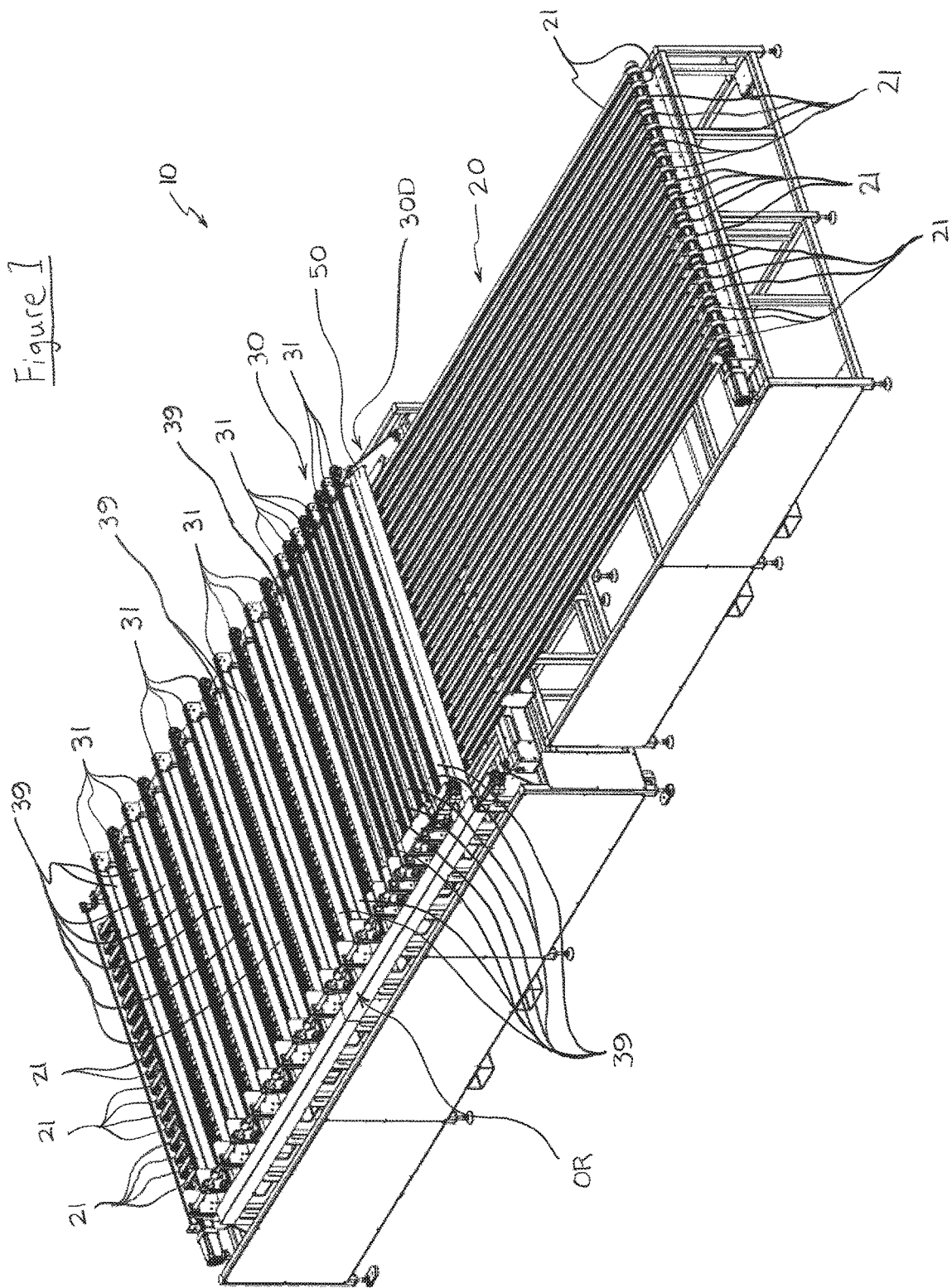
FIG. 1 is a perspective view of a drop batch builder in accordance with certain embodiments of the present invention.

The drop batch builder 10 includes an upper conveyor line 30 and a lower conveyor line 20. One embodiment is shown in FIG. 1. The upper conveyor line 30 is configured to convey glass sheets S along a first upper path of substrate travel. The upper conveyor line 30 also is configured to convey glass sheets S along a second upper path of substrate travel. The first and second upper paths of substrate travel are crosswise to each other. In some cases, they are perpendicular, at least substantially perpendicular, or at least generally perpendicular to each other. Preferably, the first and second upper paths of substrate travel both are horizontal, at least substantially horizontal, or at least generally horizontal.

In some embodiments, the upper conveyor line is configured to receive substrates from (e.g., has an intake end adjacent to an output end of) an upstream conveyor line. When provided, such an upstream conveyor line can optionally be configured (and operated) to deliver substrates away from a glass seaming station or another upstream processing station and to the upper conveyor line. More will be said of this later.

FIG. 9 schematically depicts the nature of the first and second upper paths of substrate travel in accordance with certain embodiments. Here, the first upper path of substrate travel is depicted by reference number 30A, and the second upper path of substrate travel is depicted by reference number 30B. The first upper path of substrate travel 30A comprises (e.g., follows and/or is oriented to extend along) an axis along which, or parallel to which, the upper conveyor line 30 is configured to convey glass sheets S. In FIG. 9, the direction in which the illustrated arrow 30A points is referred to herein as an "ingress direction," i.e., a direction in which substrates S conveyed into the drop batch builder 10 are moved. Thus, in embodiments involving an ingress conveyor line 100, such as those of FIGS. 2, 7, 8, and 10, glass sheets conveyed from the ingress conveyor line onto the upper conveyor line 30 preferably move along or parallel to (or at least substantially or generally parallel to) the illustrated arrow 30A.

The upper conveyor line 30 preferably is configured (and in some cases, is operated) to move a glass sheet S both forward and rearward (e.g., first forward, then rearward) along the first upper path of substrate travel 30A. In some situations, this may be useful for properly aligning one or more glass sheets at desired lateral positions before dropping them down onto the lower conveyor line 20 into their desired locations in a particular batch arrangement.

Thus, a glass sheet on the upper conveyor line 30 can be conveyed along or parallel to (or at least substantially or generally parallel to) arrow 30A until such glass sheet reaches a lateral location (i.e., a desired location along lateral axis LA) where such glass sheet is ultimately intended to be located (i.e., after subsequently being dropped) on the lower conveyor line 20. The upper conveyor line 30 can then be operated so as to: (1) stop moving the glass sheet along the first upper path of substrate travel 30A, and (2) start moving such glass sheet along the second upper path of substrate travel 30B.

The second upper path of substrate travel 30B comprises (e.g., follows and/or is oriented to extend along) an axis along which, or parallel to which, the upper conveyor line 30 is configured to convey a glass sheet after such glass sheet has been conveyed along the first upper path of substrate travel 30A. As noted above, the second upper path of substrate travel 30B is crosswise to the first upper path of substrate travel 30A. Thus, through the process of ceasing movement of a glass sheet along the first upper path of substrate travel 30A and initiating its movement along the second upper path of substrate travel 30B, the substrate changes directions. This may involve the glass sheet changing its movement direction by about 90 degrees. The crosswise direction-change angle, however, can be greater or less, as desired.

In some cases, the upper conveyor line 30 is configured (and in some cases, is operated) to move a glass sheet both forward and rearward (e.g., first forward, then rearward) along the second upper path of substrate travel 30B. In some cases, this may provide flexibility in how one carries out the sequencing and arranging of various sets of glass sheets, which arrive at the upper conveyor in various orders, into various different batch arrangements.

The upper conveyor line 30 has a drop region 30D configured to drop a glass sheet from the upper conveyor line downwardly onto the lower conveyor line 20. Preferably, the drop region 30D includes an end region (e.g., a terminal end) of the upper conveyor line 30. This distal end region preferably has and/or defines a cliff, drop-off, ramp, one or more intermediate-elevation rollers, balls, or cams, or another type of downward path to the lower conveyor line 20. Thus, the second upper path of substrate travel 30B preferably terminates at the drop region 30D. A landing region LR of the lower conveyor line 20 is located just beyond and below such end region of the upper conveyor line 30.

The drop region 30D preferably extends along an elongated lateral width (i.e., parallel to lateral axis LA) of the upper conveyor line 30, such that the upper conveyor line is configured to drop glass sheets at any of a plurality of different locations along (e.g., spanning a continuous range of) the lateral width (i.e., at any of a plurality of different lateral locations) of the drop region. As a result, the upper conveyor 30 is able to organize glass sheets in many different batch arrangements on the lower conveyor. In more detail, the noted distal end region (and its cliff, drop-off, ramp, or the like) of the upper conveyor line 30 preferably extends along an elongated lateral width of the upper conveyor line. In some cases, the drop region 30D spans the entire lateral width (or at least 50%) of the lower conveyor line 20. Thus, in the embodiments illustrated, the noted distal end region (and its cliff, drop-off, ramp, or the like) of the upper conveyor line 30 spans the entire lateral width of the lower conveyor line 20. In other embodiments, it may span at least 50%, at least 75%, or substantially the entire lateral width of the lower conveyor line. This allows a given glass sheet to be dropped downwardly onto the lower conveyor line 20 at any of a variety of lateral locations on (e.g., at any lateral location of) the lower conveyor line.

The lower conveyor line is configured to convey glass sheets along a lower path of substrate travel. In more detail, the lower conveyor line is configured (and operated) to convey a dropped glass sheet (i.e., a glass sheet dropped from the upper conveyor line onto the lower conveyor line) along the lower path of substrate travel to an overpass region. Upon reaching the overpass region, the glass sheet will be located beneath (e.g., will pass under) the upper conveyor line.

In FIG. 9, the lower path of substrate travel is depicted by reference number 20A. While not explicitly shown in FIG. 9, it is to be appreciated that the lower path of substrate travel 20A extends through the overpass region OR (e.g., passes under the upper conveyor 30). Thus, the lower path of substrate travel 20A is continuous from the landing region LR into the overpass region OR. In the embodiment of FIG. 9, the lower path of substrate travel 20A is continuous from the landing region LR, through the overpass region OR, and along an egress region ER.

The lower path of substrate travel 20A is crosswise to the first upper path of substrate travel 30A. In some cases, these two paths 20A, 30A are perpendicular, at least substantially perpendicular, or at least generally perpendicular to each other.

The upper conveyor line 30 is at a higher elevation than the lower conveyor line 20. The second upper path of substrate travel 30B, for example, can be at an elevation higher than that of the lower path of substrate travel 20A by at least one inch, at least two inches, or at least three inches (this can be measured by comparing the elevation of the bottom surface of a glass sheet when conveyed along the second upper path of substrate travel relative to the elevation of the bottom surface of the same glass sheet when conveyed along the lower path of substrate travel). In addition, the difference preferably is less than 18 inches, less than 16 inches, less than 12 inches, less than 10 inches, less than eight inches, less than six inches, less than five inches, or even less than four inches. In some cases, the distance is between one inch and 12 inches, or between two inches and 11 inches, such as between 1.5 inches and 10 inches, or between two inches and nine inches. In one non-limiting example, this distance is about 3.75 inches.

As noted above, the lower conveyor line 20 extends beneath (e.g., passes under) the upper conveyor line 30 at an overpass region OR. In more detail, a region (i.e., the overpass region) of the lower conveyor line 20 is located directly beneath the upper conveyor line 30. As a result, a glass sheet conveyed along the lower conveyor line 20 passes directly under (e.g., so as to be received in a tunnel defined under) the upper conveyor line 30 when moving through the overpass region OR. Thus, in some embodiments, a glass sheet positioned on the lower conveyor line is received in a tunnel (or a nest space) defined under the upper conveyor line.

Preferably, the entire lateral width (or at least 50%, or at least 75%) of the lower conveyor line 20 is located directly beneath the upper conveyor line 30 at the overpass region OR. In the embodiments illustrated, only a portion of the longitudinal length of the lower conveyor line 20 is located under the upper conveyor line 30. Preferably, that covered portion (or "nested portion") of the longitudinal length of the lower conveyor line 20 has a length of at least three feet, at least four feet, at least five feet, or at least six feet, such as from 3-25 feet, 4-25 feet, 5-25 feet, or 6-25 feet. Thus, at the overpass region OR, there preferably is a tunnel (or a nest space) through which the lower path of substrate travel 20A extends (and through which glass sheets conveyed along the lower conveyor line 20 pass).

In view of the foregoing description, it can be appreciated that, upon conveying a glass sheet along the second upper path of substrate travel 30B, the glass sheet reaches a drop region 30D where it is dropped from the upper conveyor line 30 downwardly onto the lower conveyor line 20. The terms "drop," "dropped," "dropping" and the like, as used herein, refer to delivering a glass sheet downwardly from the upper conveyor line 30 to the lower conveyor line 20 by any of: (1) a free-fall of the glass sheet downwardly from the upper conveyor line onto the lower conveyor line (including a fall of the leading region of the glass sheet while its trailing region is supported by the upper conveyor line, followed by a fall of the trailing region thereof while its leading region is supported by the lower conveyor line), (2) sliding the glass sheet downwardly along a ramp or other support(s) to the lower conveyor line, or (3) conveying the glass sheet downwardly by rolling it along one or more intermediate-elevation rollers (i.e., rollers located at one or more elevations between that of the upper conveyor line and that of the lower conveyor line), wheels, ball casters, or the like. Preferably, this does not involve lowering (and the drop batch builder preferably is not configured to lower) the glass sheet on an elevator, a vertical conveyor, frame, set of bearings, or other transport device that moves downwardly itself so as to support the entire glass sheet while carrying it down to the lower conveyor line.

Thus, the drop zone 30D (and the rest of the drop batch builder 10) preferably is devoid of an elevator, a vertical conveyor, and any other such transport device. Similarly, the present methods preferably do not involve operating any elevator or vertical convey to move a glass sheet. The drop batch builder 10 (e.g., the drop region 30 thereof) preferably is also devoid of any suction device for handling glass sheets. For example, the drop batch builder 10 (e.g., the drop region 30 thereof) preferably does not have any suction device (e.g., for handling glass sheets) that is located between two transport rollers. Similarly, the present methods preferably do not involve operating any suction device to engage (e.g., grab and move) a glass sheet.

Figure 3:
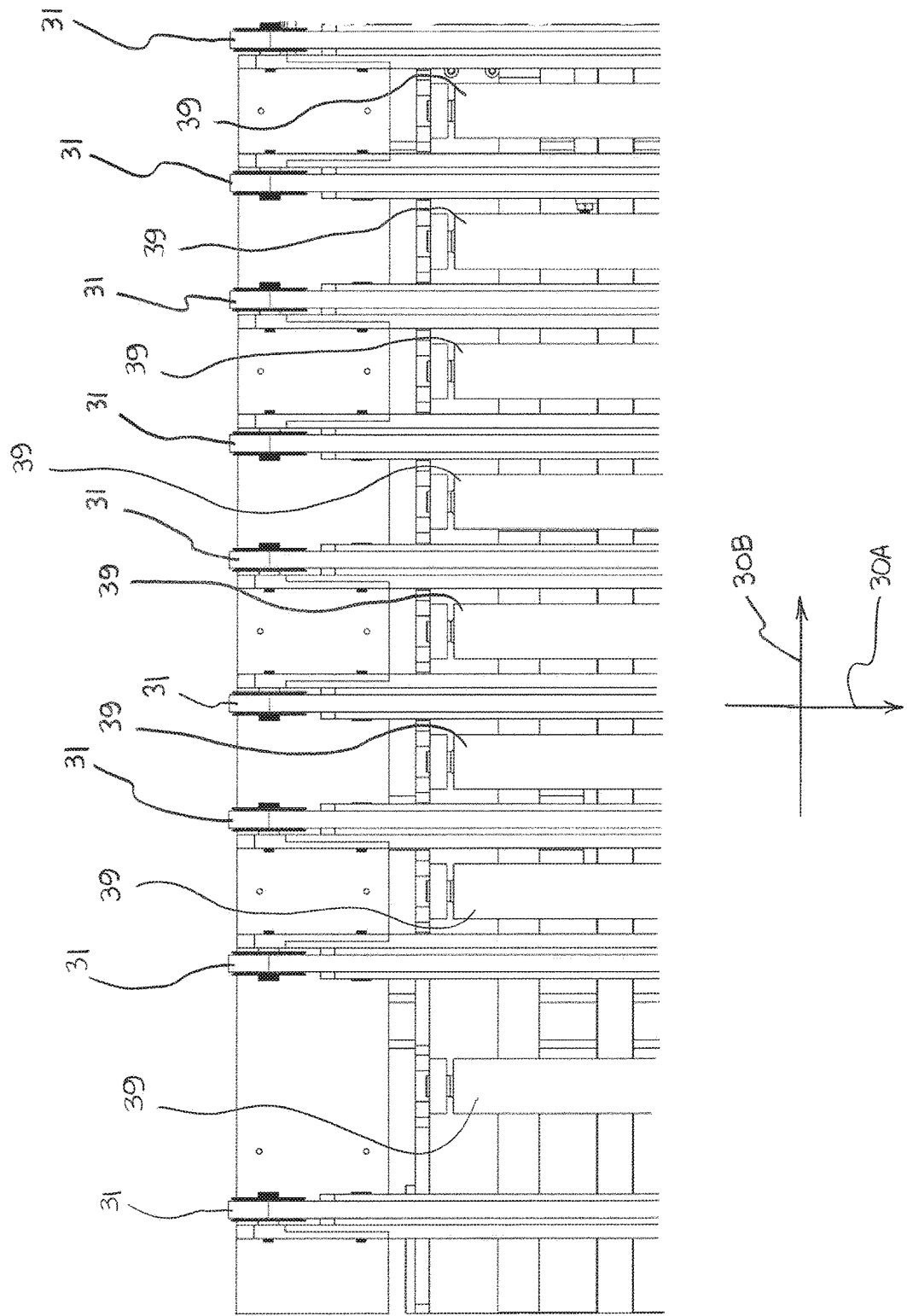
FIG. 3 is a partially broken-away plan view of a section of an upper conveyor line of the drop batch builder of FIG. 1 or FIG. 2.

As noted above, the upper conveyor line 30 is configured to convey a glass sheet along a first upper path of substrate travel 30A and then along a second upper path of substrate travel 30B, which is crosswise to the first upper path of substrate travel. To accomplish this, the upper conveyor line 30 preferably comprises both a set of transport rollers 39 and a set of conveyor belts 31. This is perhaps best seen in FIG. 3, which is a partially broken-away detail view of a section of the upper conveyor line 30 of FIG. 1. Here, the conveyor belts 31 are configured to convey a glass sheet in one direction (i.e., along the first upper path of substrate travel 30A), whereas the transport rollers 39 are configured to convey the glass sheet in another direction (i.e., along the second upper path of substrate travel 30B). Thus, a glass sheet can be conveyed along the first upper path of substrate travel 30A by operating the conveyor belts 31 until the glass sheet reaches a desired lateral location. At that point, the transport rollers 39 are raised, the conveyor belts 31 are lowered, or both. This brings the transport rollers 39 into supportive contact with the bottom of the glass sheet and moves the conveyor belts 31 out of contact with the bottom of the glass sheet. In some cases, the transport rollers 39 are then operated (e.g., one or more of them are driven to rotate) so as to convey the glass sheet along the second upper path of substrate travel 30B. Preferably, none of the transport rollers 39 of the drop batch builder 10 are part of an elevator or a vertical conveyor (i.e., the drop batch builder preferably is devoid of any transport rollers that are part of an elevator or a vertical conveyor).

Figure 4:
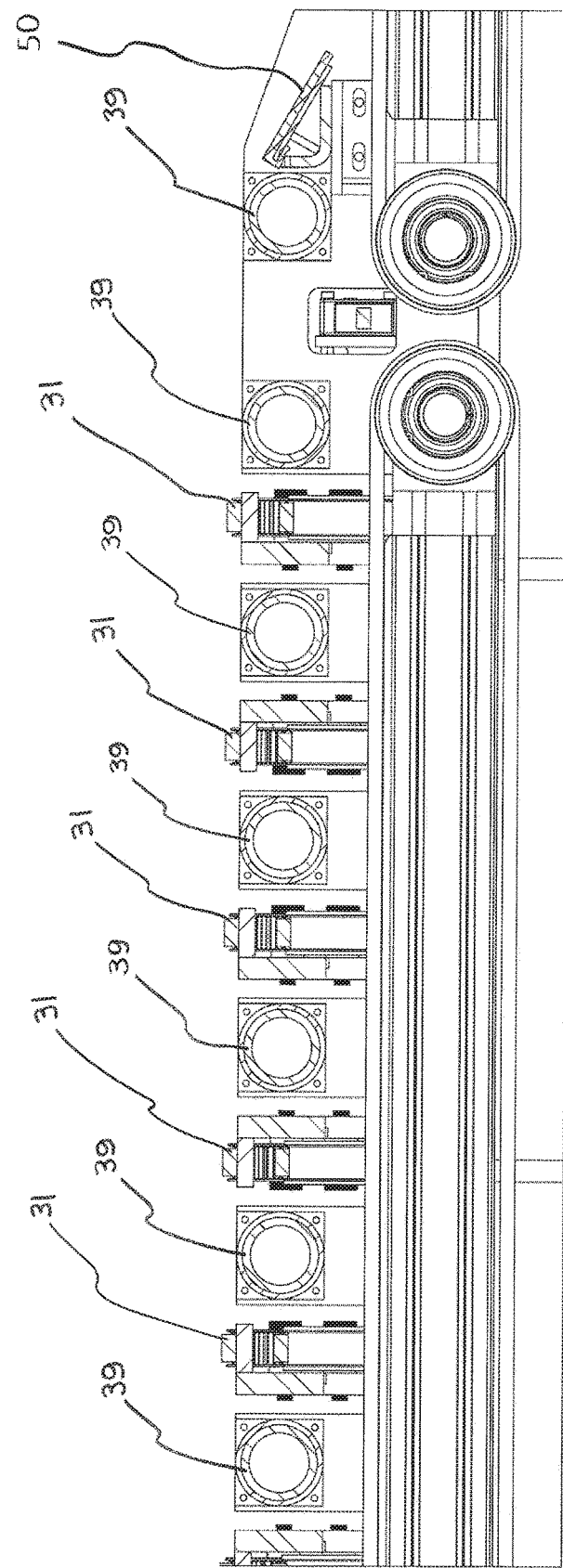
FIG. 4 is a partially broken-away elevation view of a section of an upper conveyor line of the drop batch builder of FIG. 1 or FIG. 2.
Figure 5:
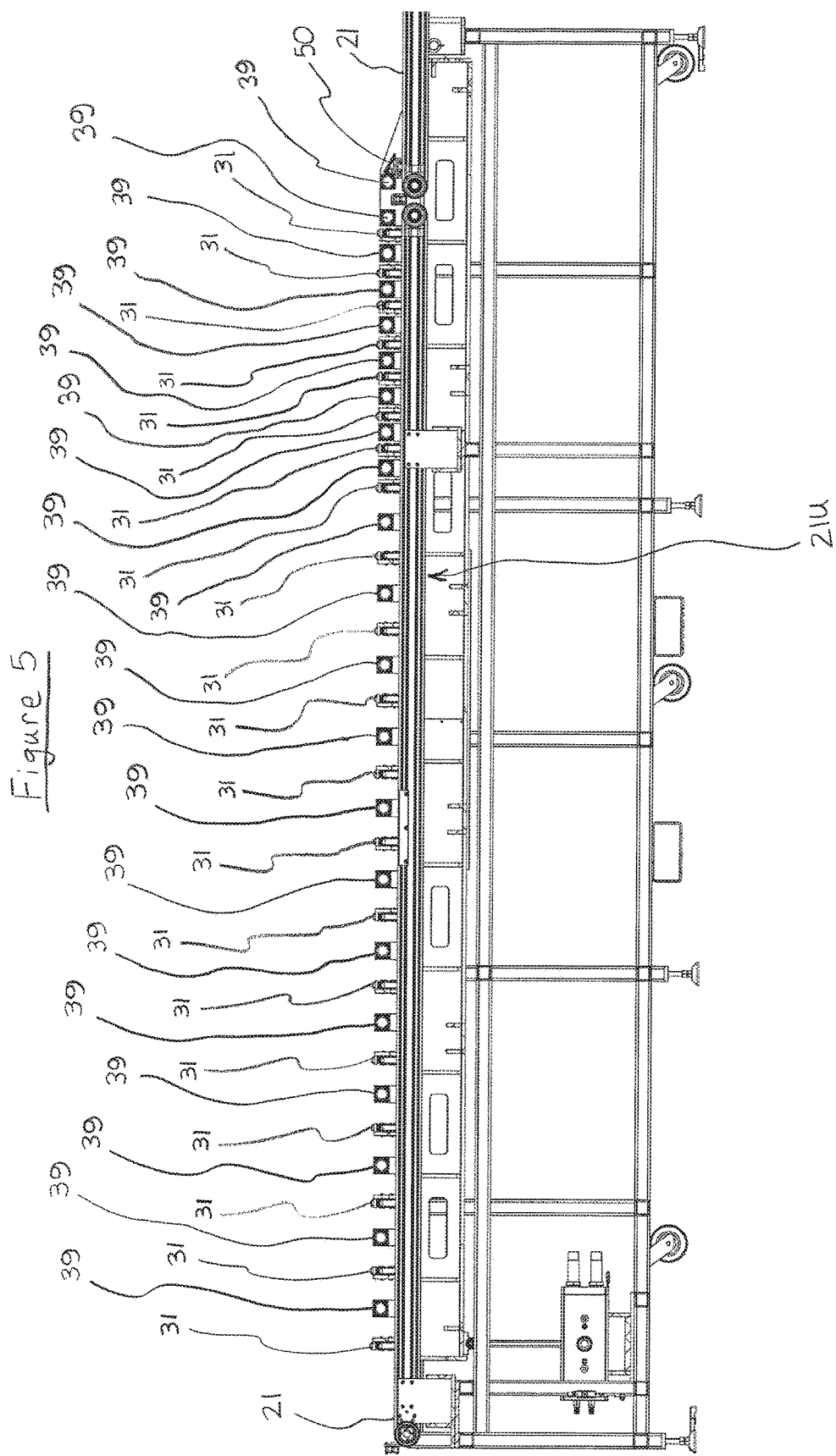
FIG. 5 is an elevation view of the drop batch builder of FIG. 1 or FIG. 2, with a set of transport rollers shown in a lowered configuration.
Figure 6:
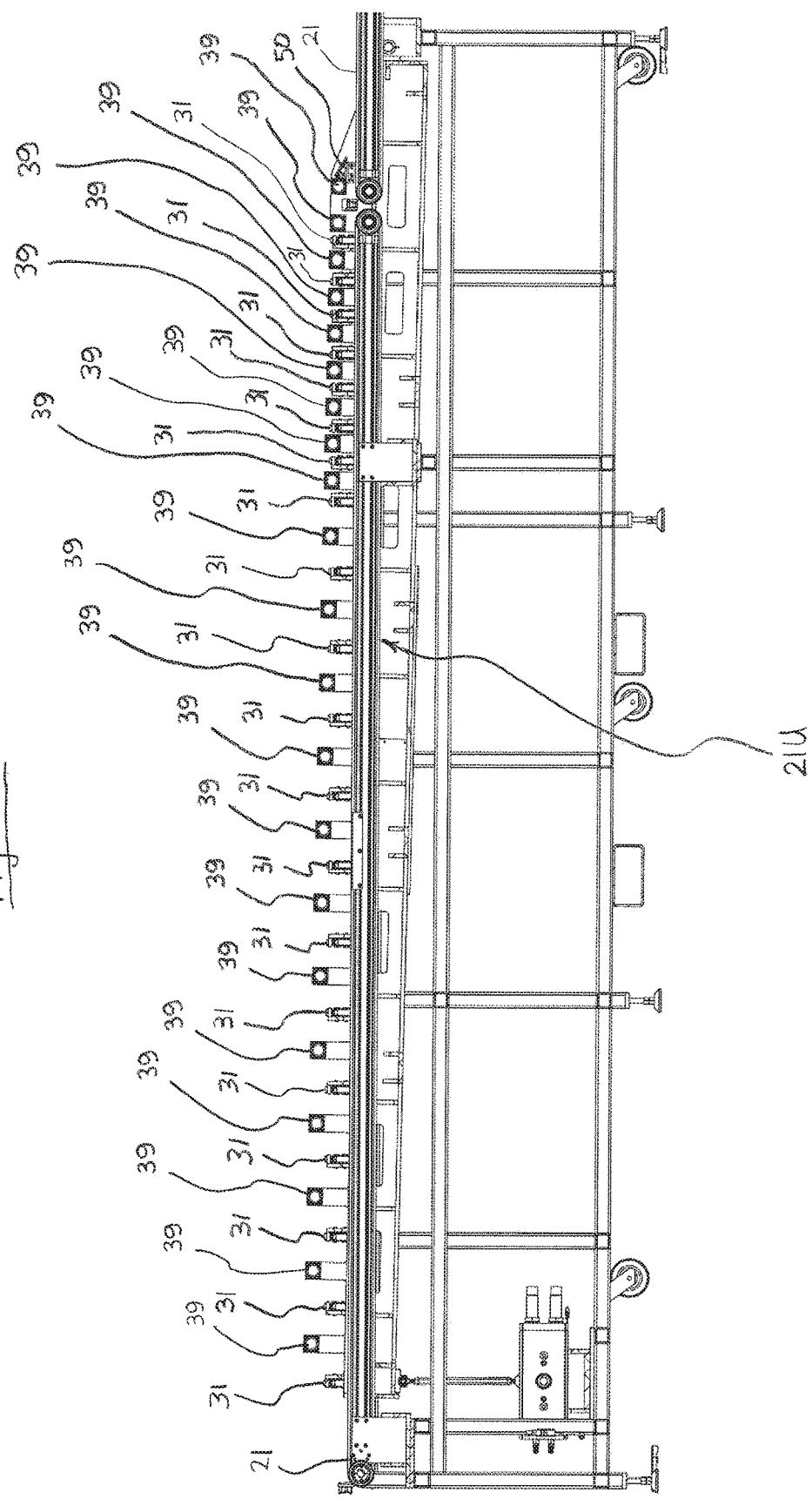
FIG. 6 is an elevation view of the drop batch builder of FIG. 1 or FIG. 2, with the set of transport rollers shown in a raised configuration.

The set of transport rollers 39 preferably has a raised configuration and a lowered configuration. The transport rollers 39 when in the lowered configuration have upper surfaces at a lower elevation than upper surfaces of the conveyor belts 31. This is shown in FIGS. 4 and 5. In contrast, the transport rollers 39 when in the raised configuration have upper surfaces at a higher elevation than upper surfaces of the conveyor belts 31. This is shown in FIG. 6. Thus, when conveyor belts 31 are in supportive contact with a glass sheet on the upper conveyor line 30, the upper conveyor line is configured to convey such glass sheet along the first upper path of substrate travel 30A, whereas when transport rollers 39 are in supportive contact with a glass sheet on the upper conveyor line 30, the upper conveyor line is configured to convey such glass sheet along the second upper path of substrate travel 30B.

The set of transport rollers 39 when in the raised configuration can optionally provide the second upper path of substrate travel 30B with an incline. This can be seen in FIG. 6, where the transport rollers on the left side of the image are raised to higher elevations than the transport rollers on the right side of the image. In this manner, the tops of the transport rollers can collectively define a ramp inclined downwardly in the direction of the drop region 30D. In such cases, the transport rollers 39 may or may not be powered so as to be adapted to positively drive a glass sheet moving along the second upper path of substrate travel 30B. Depending on the extent of this incline, if any, the glass sheet may move along the second upper path of substrate travel 30B under gravity alone. Preferably, though, one or more of the transport rollers 39 are driven so as to be adapted to positively move the glass sheet along the second upper path of substrate travel 30B.

The set of transport rollers 39 can optionally be mounted to a pivotal frame. In embodiments of this nature, the frame is pivotal between raised and lowered positions. In such cases, when the frame is in the raised position, the set of transport rollers is in the raised configuration (see FIG. 6), and when the frame is in the lowered position, the set of transport rollers is in the lowered configuration (see FIGS. 4 and 5). In other cases, all the transport rollers of the set are adapted to move straight up and down simultaneously and by the same distance (rather than through a pivoting action) when moving between the raised and lowered configurations.

The upper conveyor line 30 can optionally include a first region having a first set of transport rollers 39 and a second region having a second set of transport rollers 39. In such cases, the first and second regions preferably are adjacent (e.g., contiguous) to each other. In the first region, the transport rollers 39 can optionally be spaced further apart than are the transport rollers 39 in the second region. The second region can advantageously be adjacent to the drop region 30 of the upper conveyor line 30. This can be appreciated by referring to FIGS. 1, 2, 3, 5, 6, 7, and 8. The first and second regions can optionally each have at least three transport rollers, at least four transport rollers, at least five transport rollers, or at least six transport rollers.

If desired, the upper conveyor line can alternatively be configured such that transport rollers are configured to convey a glass sheet along the first upper path of substrate travel, whereas conveyor belts are configured to subsequently convey such a glass sheet along the second upper path of substrate travel.

In view of the foregoing, it can be appreciated that the upper conveyor line 30 preferably is bidirectional (i.e., configured to convey a glass sheet along at least two axes that are crosswise to each other), whereas the lower conveyor line 20 (or at least the landing region LR thereof) preferably is unidirectional (i.e., configured to convey a glass sheet along, or parallel to, only a single axis).

Figure 2:
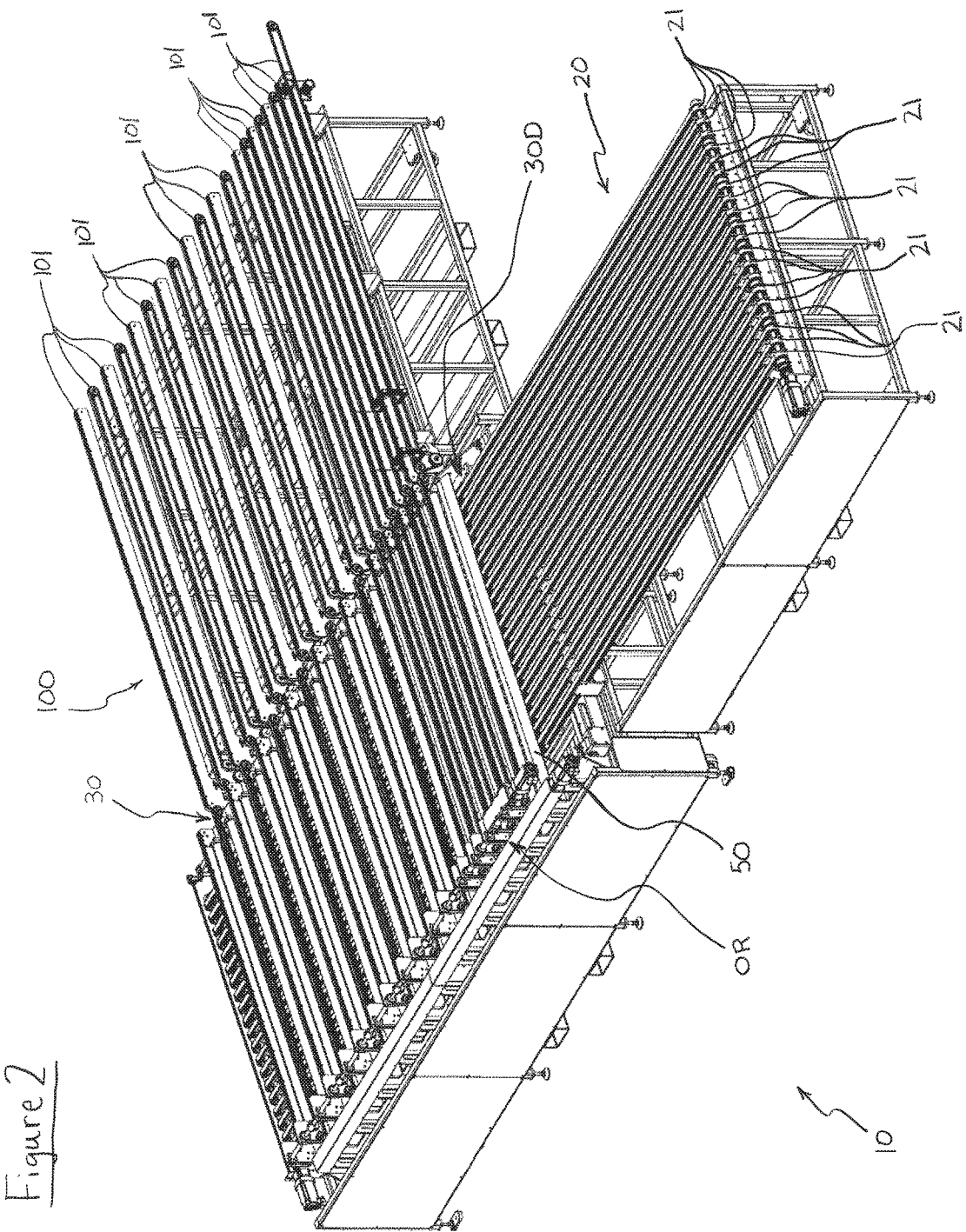
FIG. 2 is another perspective view of a drop batch builder in accordance with certain embodiments of the invention.

FIG. 2 depicts another embodiment of the drop batch builder 10. Here, an ingress conveyor line 100 is configured (and is operated) to deliver glass sheets onto the upper conveyor line 30. The optional ingress conveyor line 100 may, for example, be downstream from a glass seaming station or another upstream processing station 200. Reference is made to FIG. 10.

As noted above, the lower conveyor line 20 is configured to convey a dropped glass sheet (i.e., a glass sheet dropped from the upper conveyor line 30) along the lower path of substrate travel 20A to the overpass region OR, where such dropped glass sheet is located under (e.g., passes under) the upper conveyor line. The overpass region OR preferably is sized to receive a plurality of glass sheets. As is perhaps best appreciated by referring to FIG. 7, the overpass region OR can optionally be sized to receive an entire batch of glass sheets $S_{1-n}$. The batch may consist of three or more, four or more, five or more, or even six or more glass sheets. In such cases, each glass sheet can optionally have a major dimension (e.g., a length) of at least one foot, at least two feet, or at least three feet. Thus, in some embodiments all the glass sheets of such a batch can be received in a tunnel or nest region (e.g., so as to be positioned directly under the upper conveyor line 30) at the overpass region OR.

Figure 7:
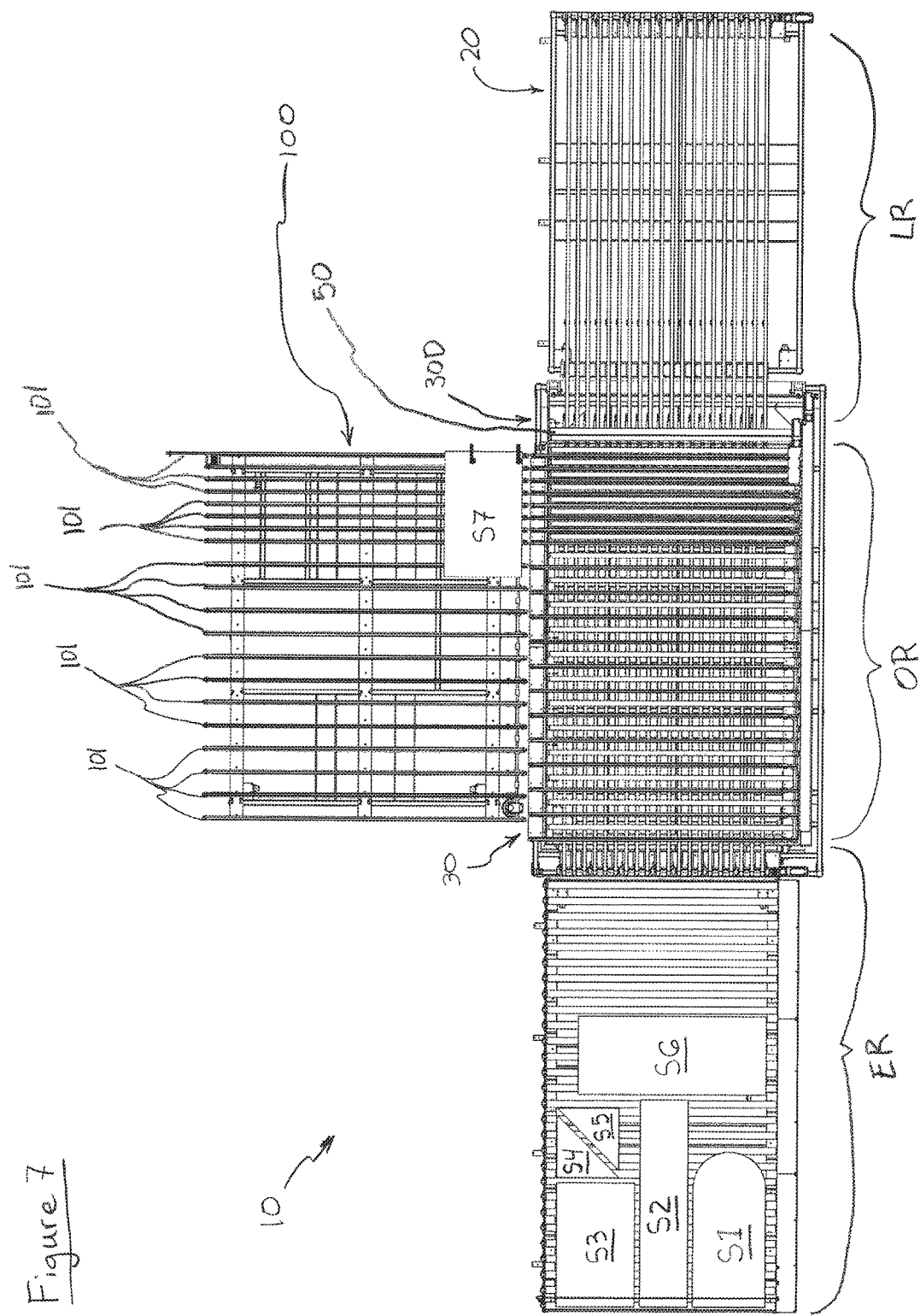
FIG. 7 is a plan view of a drop batch builder in accordance with certain embodiments of the invention, with a plurality of glass sheets organized in a batch arrangement on an egress conveyor section of the drop batch builder.

In the non-limiting example of FIG. 7, the illustrated batch arrangement consists of six glass sheets. Here, it is to be appreciated that glass sheet S7 is the first of a plurality of glass sheets that are about to be arranged on the lower conveyor line in the next batch arrangement.

In FIGS. 1 and 2, the illustrated lower conveyor line 20 is perpendicular (or at least substantially perpendicular) to the illustrated upper conveyor line 30. In such cases, the lower conveyor line 20 is configured to convey a glass sheet along a path of substrate travel 20A that is perpendicular (or at least substantially perpendicular) to a path of substrate travel 30A of the upper conveyor line 30. Further, the illustrated lower conveyor line 20 has its length elongated along an axis (parallel to path 20A) that is perpendicular (or at substantially perpendicular) to an axis (e.g., path 30A) along which the illustrated upper conveyor line 30 is elongated. It is to be appreciated that while these angles are crosswise, they need not be perpendicular or substantially perpendicular.

Figure 8:
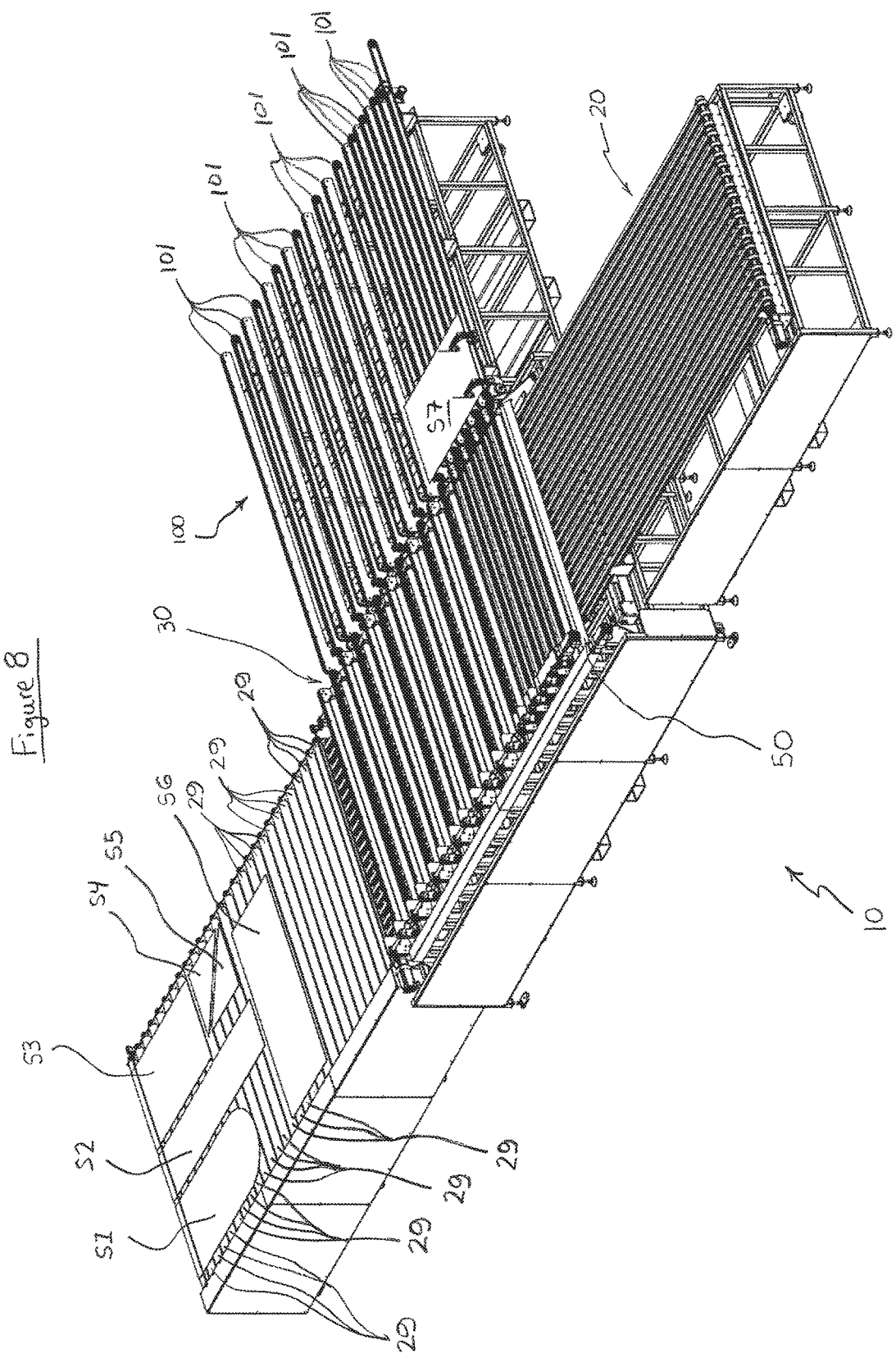
FIG. 8 is a perspective view of the drop batch builder and glass sheets of FIG. 7.

FIGS. 7 and 8 depict another embodiment of the drop batch builder 10. Here, the lower path of substrate travel extends from a landing region LR, downstream to the overpass region OR, and further downstream to an egress region ER. The landing region LR is a region of the lower conveyor line 20 where glass sheets dropped from the drop region 30D of the upper conveyor line 30 are received (e.g., land) on the lower conveyor line. The landing region LR preferably is configured such that a glass sheet dropped there is received (e.g., lands) in an orientation that is horizontal, at least substantially horizontal, or at least generally horizontal. As noted above, the overpass region OR is a region of the lower conveyor line 20 where glass sheets are conveyed along the lower path of substrate travel so as to pass beneath the upper conveyor line 30. The egress region ER is a region of the lower conveyor line 20 where glass sheets are conveyed away from the overpass region (e.g., toward a tempering furnace or another downstream processing station).

In the embodiment of FIGS. 7 and 8, the egress region ER and the landing region LR are located on opposite sides of the overpass region OR. In other embodiments, the egress region is on the same side of the overpass region as is the landing region, but the egress region is located further from the overpass region than is the landing region. Either way, the egress region ER preferably extends away from the overpass region OR and toward (e.g., to) a tempering furnace or another downstream processing station 500. Reference is made to FIG. 10.

In some embodiments, the landing region LR of the lower conveyor line 20 has conveyor belts or transport rollers, but not both. In FIGS. 1, 2, 7, and 8, the landing region LR of the illustrated lower conveyor line 20 has conveyor belts 21 but not transport rollers. Here, the conveyor belts 21 are elongated in a longitudinal direction (e.g., perpendicular to lateral axis LA), and preferably are at least substantially parallel to the second upper path of substrate travel 30B.

These conveyor belts 21 preferably have a padded upper surface. For example, the belts themselves or at least upper portions thereof preferably are formed of rubber or another padding material that softens the impact of the glass sheets in landing upon the lower conveyor.

Further, in some embodiments, the overpass region OR of the lower conveyor line 20 has conveyor belts or transport rollers, but not both. In FIGS. 1, 2, 7, and 8, the overpass region OR of the illustrated lower conveyor line 20 has conveyor belts 21 but not transport rollers. Similarly, in some embodiments, the egress region ER of the lower conveyor line 20 has transport rollers or conveyor belts, but not both. In the embodiments of FIGS. 7 and 8, the egress region ER of the illustrated lower conveyor line 20 has transport rollers 29 but not conveyor belts. This, however, is by no means required.

In certain embodiments, the drop batch builder 10 includes (e.g., carries) a batch of glass sheets $S_{1-n}$ positioned in a desired arrangement on a conveyor, e.g., at the landing region of the lower conveyor line, at the overpass region of the lower conveyor line, or at an egress region of the lower conveyor line. FIGS. 7 and 8 depict one such batch of glass sheets $S_{1-n}$ positioned in a desired arrangement on the egress region ER of the lower conveyor line 20. Here, a batch of six glass sheets is disposed in a particular arrangement. It is to be appreciated, however, that glass sheets can be provided in a variety of other batch arrangements. The number, size, shape, and arrangement of the glass sheets shown in FIGS. 7 and 8 merely reflect one of many possible batch arrangements.

Thus, the drop batch builder 10 is capable of performing (e.g., configured to perform) multiple variants of an automated process in which different sets of glass sheets delivered from the upper conveyor line 30 to the lower conveyor line 20 are organized in different batch arrangements on the lower conveyor line. This is the case even when the different sets of glass sheets include different numbers, sizes, and/or shapes of glass sheets. Thus, based on the particular sizes and shapes of the glass sheets to be organized into a given batch arrangement, the drop batch builder 10 is adapted (e.g., and is operated) to arrange different sets of glass sheets into different batch arrangements.

The batch of glass sheets $S_{1-n}$ includes at least two glass sheets, i.e., first S1 and second S2 glass sheets, where the first glass sheet is different from the second glass sheet in terms of size, shape, or both. In some cases, the batch of glass sheets $S_{1-n}$ includes at least three glass sheets, i.e., first S1, second S2, and third S3 glass sheets, where the first glass sheet is different from the second glass sheet in terms of size, shape, or both, the first glass sheet is different from the third glass sheet in terms of size, shape, or both, and the second glass sheet is different from the third glass sheet in terms of size, shape, or both. In some embodiments of this nature, the batch of glass sheets includes at least four glass sheets, at least five glass sheets, or at least six glass sheets, where at least two (or at least three, or at least four) of the glass sheets are different in terms of size, shape, or both.

As noted above, once a plurality of glass sheets has been organized into a batch arrangement on the lower conveyor line 20, the lower conveyor line can be operated to deliver the batch of glass sheets to a tempering furnace or another downstream processing station 500. Reference is made to FIG. 10. The drop batch builder 10 can be used to arrange glass sheets into desired batch arrangements for different applications. Glass heat treatment (such as glass tempering or glass heat strengthening) is one such application. Thus, the downstream processing station 500 may comprise an oven (e.g., a glass tempering oven) or another heat treatment station, such as a flash-treatment machine. In other cases, the downstream processing station 500 may be a coater configured (e.g., operable) to apply one or more coatings onto the glass sheets. Thus, the present drop batch builder and methods can be used to arrange glass sheets into batch arrangements to prepare them for any of a variety of downstream processing stations.

The invention also provides methods wherein a plurality of glass sheets so positioned in a batch arrangement on the lower conveyor 20 are conveyed (while being maintained in substantially the same batch arrangement) along the lower path of substrate travel 20A so as to move from the landing region LR, into the overpass region OR, and subsequently along an egress region ER. Such methods may involve conveying the so arranged batch of glass sheets from the egress region ER to a downstream glass heat treatment oven, and operating the oven so as to heat treat (e.g., temper) the batch of glass sheets.

In preferred method embodiments, the lower conveyor line 20 is operated so as to convey a batch of glass sheets, which are disposed in a particular batch arrangement, from the landing region LR, through the overpass region OR, and along an egress region ER, all the while maintaining such glass sheets in the batch arrangement.

Thus, in some embodiments, the system further includes a glass heat treatment (e.g., tempering) oven, and the egress region of the lower conveyor line is configured to convey glass sheets toward (e.g., to) the oven. Additionally or alternatively, the system may further include a glass seaming station, which is located upstream from the upper conveyor line. Reference is made to FIG. 10.

The drop batch builder 10 can optionally include a ramp 50 positioned such that a glass sheet dropped at the drop region 30D of the upper conveyor line 30 slides down the ramp onto the lower conveyor line 20. When provided, the ramp 50 can advantageously be oriented at an acute angle relative to a horizontal plane. This is perhaps best appreciated by referring to FIG. 4. The illustrated ramp comprises a plate that is elongated along the lateral axis LA.

The ramp (e.g., a plate or other ramp structure thereof) can be formed of a low-friction material. In some cases, the plate comprises (or consists of, or consists essentially of) polymer. It can optionally be a thermoplastic material. If desired, polyethylene can be used. Ultra-high-molecular-weight (UHMW) polyethylene is one advantageous option. Other options include the materials sold under the trade names Delrin or Teflon. Thus, acetal resin is one option, and polytetrafluoroethylene (PTFE) is another option.

Preferably, the lower conveyor line 20 has a width (measured parallel to the lateral axis LA), and the ramp 50 is elongated so as to extend entirely (or at least substantially entirely) along the width of the lower conveyor line. This is shown in FIGS. 1, 2, 7, and 8.

The first upper path of substrate travel 30A preferably is parallel to the width of the lower conveyor line 20 and perpendicular to the lower path of substrate travel 20A. The upper conveyor line 30 can optionally be configured to convey a glass sheet both forwardly and backwardly along the first upper path of substrate travel 30A. Thus, a desired glass sheet can be moved to any desired lateral location on the upper conveyor line. The upper conveyor line 30 is also configured to convey the desired glass sheet (once located at the desired lateral location) along the second upper path of substrate travel 30B to the drop region 30D, such that the desired glass sheet is thereupon dropped down onto the lower conveyor line 20 at a desired position along the width of the lower conveyor line.

Preferably, the lower conveyor line 20 is configured to convey such a glass sheet both forwardly and backwardly along the lower path of substrate travel 20A. This can facilitate placing a subsequent glass sheet either in front of or behind the first glass sheet on the lower conveyor line 20.

The invention also provides methods of using a drop batch builder 10. In such methods, the drop batch builder 10 comprises an upper conveyor line 30 and a lower conveyor line 20. The upper conveyor line 30 is at a higher elevation than the lower conveyor line 20. The lower conveyor line 20 passes under the upper conveyor line 30 at an overpass region OR. The present methods involve operating the upper conveyor line 30 to convey a first glass sheet along a first upper path of substrate travel 30A, and thereafter operating the upper conveyor line to convey the first glass sheet along a second upper path of substrate travel 30B. The first and second upper paths of substrate travel 30A, 30B are crosswise to each other.

The first glass sheet is conveyed along the second upper path of substrate travel 30B until reaching a drop region 30D of the upper conveyor line 30, whereupon the first glass sheet is dropped from the upper conveyor line downwardly onto the lower conveyor line 20. Preferably, when the first glass sheet is dropped from the upper conveyor line 30 downwardly onto the lower conveyor line 20, it lands in a horizontal orientation (i.e., with its opposed upper and lower faces oriented horizontally, at least substantially horizontally, or at least generally horizontally) on the lower conveyor line. Thus, the landing region LR of the lower conveyor line 20 preferably is configured to receive such a dropped glass sheet in a horizontal orientation.

When the first glass sheet is dropped onto the lower conveyor line, the glass sheet preferably lands on one or more conveyor belts (optionally having padded upper surfaces onto which the first glass sheet falls). Such one or more conveyor belts preferably are configured to then convey the first glass along the lower path of substrate travel 20A.

When the first glass sheet is moved along the first upper path of substrate travel 30A, it preferably is maintained in a horizontal orientation while being conveyed in a horizontal direction (or at least a generally horizontal direction), and when the first glass sheet is moved along the second upper path of substrate travel 30B, it preferably is maintained in a horizontal orientation while being conveyed in a horizontal direction (or at least a generally horizontal direction). As noted above, the second upper path of substrate travel 30B may be inclined downwardly in the direction of the drop region 30D. Thus, the conveyance of the first glass sheet toward the drop region 30D may involve the first glass sheet moving along a gradual downward incline.

In some cases, the dropping of the first glass sheet from the upper conveyor line 30 downwardly onto the lower conveyor line 20 involves sliding the first glass sheet down a ramp 50 onto the lower conveyor line. In such cases, the ramp 50 can optionally be oriented at an acute angle relative to a horizontal plane (as is perhaps best seen in FIGS. 4-6). Additionally or alternatively, the lower conveyor line 20 can have a width (measured parallel to lateral axis LA), with the ramp 50 being elongated so as to extend entirely (or at least substantially entirely) along the width of the lower conveyor line.

Preferably, the present methods further involve operating the lower conveyor line 20 to convey the first glass sheet along the lower path of substrate travel 20A to an overpass region OR, where the first glass sheet passes under (e.g., directly under) the upper conveyor line 30. As noted above, the lower path of substrate travel 20A is crosswise to the first upper path of substrate travel 30A. In some cases, the lower path of substrate travel 20A is perpendicular (or at least substantially perpendicular) to the first upper path of substrate travel 30A and parallel (or at least substantially parallel) to the second upper path of substrate travel 30B.

Preferably, the lower path of substrate travel 20A extends from a landing region LR, downstream to the overpass region OR, and in some cases, further downstream to an optional egress region ER. In such cases, the landing region LR is a region of the lower conveyor line 20 where glass sheets dropped from the drop region 30D of the upper conveyor line 30 are received on the lower conveyor line 20. The overpass region OR is a region where glass sheets are conveyed along the lower conveyor line so as to pass beneath the upper conveyor line 30. The egress region ER is a region of the lower conveyor line 20 where glass sheets are conveyed away from the overpass region OR.

In some embodiments, the present methods further involve conveying the first glass sheet along the lower conveyor line and to a glass tempering furnace. This may involve conveying the first glass sheet along an egress region ER and to a glass tempering furnace or another downstream processing station 500. Additionally or alternatively, a glass seaming station can be provided upstream of the upper conveyor line, and the method can involve conveying the first glass sheet from the glass seaming station to the upper conveyor line.

In some embodiments, the first upper path of substrate travel 30A is parallel (or at least generally parallel) to a width of the lower conveyor line 20 and perpendicular (or at least generally perpendicular) to the lower path of substrate travel 20A. In such cases, the operation of the upper conveyor line 30 may be performed so as to convey the first glass sheet along the first upper path of substrate travel 30A to a desired lateral location on the upper conveyor line 30. Preferably, the upper conveyor line 30 is then operated so as to convey the first glass sheet along the second upper path of substrate travel 30B to the drop region 30D, such that the first glass sheet is thereupon dropped down onto the lower conveyor line 20 at a desired lateral position along the width of the lower conveyor line.

In the embodiments of FIGS. 1-7, the upper conveyor line 30 comprises both a set of transport rollers 39 and a set of conveyor belts 31. In embodiments of this nature, the conveying of the first glass sheet along the first upper path of substrate travel 30A preferably comprises operating the conveyor belts 31, whereas the conveying of the first glass sheet along the second upper path of substrate travel 30B preferably comprises operating the transport rollers 39. Thus, the transport rollers 39 can drive the first glass sheet off an end of the upper conveyor line 30 (at the drop region 30D) and down onto the lower conveyor line 20.

The set of transport rollers 39 preferably has a raised configuration and a lowered configuration. The transport rollers 39 when in the lowered configuration have upper surfaces at lower elevation than upper surfaces of the conveyor belts 31. The transport rollers 39 when in the raised configuration have upper surfaces at higher elevation than upper surfaces of the conveyor belts 31. Thus, in certain embodiments, the method involves maintaining the transport rollers 39 in the lowered configuration while operating the conveyor belts 31, thereafter moving the transport rollers to the raised configuration, and maintaining the transport rollers in the raised configuration while operating them, e.g., so as to drive the first glass sheet off an end of the upper conveyor line 30 (i.e., at the drop region 30D) and down onto the lower conveyor line 20.

In some cases, the set of transport rollers is mounted to a pivotal frame, and the method involves pivoting the frame so as to move the transport rollers from the lowered configuration to the raised configuration.

Preferably, the method further involves operating the upper conveyor line 30 to convey a second glass sheet along the first upper path of substrate travel 30A, and thereafter operating the upper conveyor line to convey the second glass sheet along the second upper path of substrate travel 30B.

In one group of embodiments, the second glass sheet is conveyed along the second upper path of substrate travel 30B until reaching the drop region 30D of the upper conveyor line 30, whereupon the second glass sheet is dropped from the upper conveyor line downwardly onto the lower conveyor line 20 so as to be positioned in a side-by-side pair with the first glass sheet. In the present embodiment group, the method may further involve operating the upper conveyor line 30 to convey a third glass sheet along the first upper path of substrate travel 30A, and thereafter operating the upper conveyor line to convey the third glass sheet along the second upper path of substrate travel 30B. This may involve conveying the third glass sheet along the second upper path of substrate travel 30B until reaching the drop region 30D of the upper conveyor line 30 whereupon the third glass sheet is dropped from the upper conveyor line downwardly onto the lower conveyor line 20 so as to be positioned in a front-to-back pair with the first glass sheet, the second glass sheet, or both.

In another group of embodiments, the second glass sheet is conveyed along the second upper path of substrate travel 30B until reaching the drop region 30D of the upper conveyor line 30, whereupon the second glass sheet is dropped from the upper conveyor line downwardly onto the lower conveyor line 20 so as to be positioned in a front-to-back pair with the first glass sheet. In the present embodiment group, the method may further involve operating the upper conveyor line 30 to convey a third glass sheet along the first upper path of substrate travel 30A, and thereafter operating the upper conveyor line to convey the third glass sheet along the second upper path of substrate travel 30B. This may involve conveying the third glass sheet along the second upper path of substrate travel 30B until reaching the drop region 30B of the upper conveyor line 30, whereupon the third glass sheet is dropped from the upper conveyor line downwardly onto the lower conveyor line 20 so as to be positioned in a side-by-side pair with the first glass sheet, the second glass sheet, or both.

In still another group of embodiments, the second glass sheet is conveyed along the second upper path of substrate travel 30B until reaching the drop region 30D of the upper conveyor line 30 whereupon the second glass sheet is dropped from the upper conveyor line downwardly onto the lower conveyor line 20 so as to be positioned in a diagonal pair with the first glass sheet.

Given the present teaching as a guide, skilled artisans will appreciate that the present drop batch builder and methods can be used to organize various different sets of glass sheets into various different batch arrangements on the lower conveyor line 20.

Thus, the present method can involve operating the drop batch builder 10 so as to drop (e.g., sequentially drop) a plurality of glass sheets from the upper conveyor line 30 downwardly onto the lower conveyor line 20 so as to organize those glass sheets in a first batch arrangement on the lower conveyor line. The method can further involve operating the drop batch builder 10 so as to drop another plurality of glass sheets from the upper conveyor line 30 downwardly onto the lower conveyor line 20 so as to organize those glass sheets in a second batch arrangement on the lower conveyor line.

Before dropping the glass sheets of the second batch arrangement onto the lower conveyor line 20, the landing region LR of the lower conveyor line preferably is cleared of glass sheets. In more detail, before dropping the glass sheets of the second batch arrangement onto the lower conveyor line 20, the method preferably involves operating the lower conveyor line 20 so as to convey the glass sheets of the first batch arrangement out of the landing region LR. This may involve conveying the glass sheets of the first batch arrangement to the overpass region OR.

In some cases, the first batch arrangement is different from the second batch arrangement. For example, the second batch arrangement can have a different number of glass sheets than the first batch arrangement. Alternatively, the two batch arrangements can have the same number of glass sheets, but there can be one or more glass sheets in the second batch that are sized and/or shaped differently than one or more glass sheets in the first batch. For example, in some cases, the first and second batch arrangements each comprises at least three glass sheets, and the second batch arrangement includes at least one glass sheet that has a different size and/or shape than any glass sheet of the first batch arrangement. Further, in some cases, the first and second batch arrangements each comprises at least four glass sheets, and the second batch arrangement includes at least two glass sheets that each have a different size and/or shape than any glass sheet of the first batch arrangement.

In certain non-limiting embodiments, cutting and tempering optimization software is used to form or create the batch, which consists of multiple glass sheets (or "lites") grouped together and laid out in a pre-determined order for maximum yield during tempering. During seaming, each lite is assigned a coordinate, which determines its position in the batch. As the seamed lite enters the top deck, it is positioned according to the assigned y coordinate. Then the drop conveyor lifts the lite and synchronizes with the lower conveyor to position the lite in the batch according to the assigned x coordinate and conveys the lite off the edge of the drop conveyor and drops it in place on the lower conveyor. This will repeat until the complete batch is formed and then conveyed towards the furnace as a single batch unit that consists of multiple lites.

Various examples have been described. These and other examples are within the scope of the following claims.

The invention claimed is:

1. A method of using a drop batch builder, the drop batch builder having an upper conveyor line and a lower conveyor line, the upper conveyor line being at a higher elevation than the lower conveyor line, the lower conveyor line passing under the upper conveyor line at an overpass region, the method comprising:

operating the upper conveyor line to convey a first glass sheet along a first upper path of substrate travel, and thereafter operating the upper conveyor line to convey the first glass sheet along a second upper path of substrate travel until reaching a drop region of the upper conveyor line whereupon the first glass sheet is dropped from the upper conveyor line downwardly onto the lower conveyor line; and operating the lower conveyor line to convey the first glass sheet along a lower path of substrate travel to the overpass region where the first glass sheet passes under the upper conveyor line;

wherein the first and second upper paths of substrate travel are crosswise to each other, and wherein the lower path of substrate travel is crosswise to the first upper path of substrate travel.

2. The method of claim 1 wherein when the first glass sheet is dropped from the upper conveyor line downwardly onto the lower conveyor line the first glass sheet lands in a horizontal position on the lower conveyor line.

3. The method of claim 1 wherein when the first glass sheet is conveyed along the first upper path of substrate travel, the first glass sheet is maintained in a horizontal orientation while being conveyed in a horizontal direction, and when the first glass sheet is conveyed along the second upper path of substrate travel, the first glass sheet is maintained in a horizontal orientation while being conveyed in a horizontal direction.

4. The method of claim 1 wherein the lower path of substrate travel is perpendicular to the first upper path of substrate travel and is parallel to the second upper path of substrate travel.

5. The method of claim 1 further comprising operating the lower conveyor line to convey the first glass sheet along a lower path of substrate travel, wherein the lower path of substrate travel extends from a landing region, downstream to the overpass region, and further downstream to an egress region, the landing region being a region of the lower conveyor line where glass sheets dropped from the drop region of the upper conveyor line are received on the lower conveyor line, the overpass region being a region where glass sheets are conveyed along the lower conveyor line so as to pass beneath the upper conveyor line, and the egress region being a region of the lower conveyor line where glass sheets are conveyed away from the upper conveyor line, such that the method comprises conveying the first glass sheet from the landing region, through the overpass region, and along the egress region.

6. The method of claim 1 further comprising conveying the first glass sheet along the lower conveyor line and to a glass tempering furnace.

7. The method of claim 6 wherein a glass seaming station is upstream of the upper conveyor line, and the method comprises conveying the first glass sheet from the glass seaming station to the upper conveyor line.

8. The method of claim 1 wherein the first upper path of substrate travel is parallel to a width of the lower conveyor line and perpendicular to the lower path of substrate travel, said operating the upper conveyor line being performed so as to convey the first glass sheet along the first upper path of substrate travel to a desired lateral position on the upper conveyor line, said operating the upper conveyor line thereafter being performed so as to convey the first glass sheet along the second upper path of substrate travel to the drop region such that the first glass sheet is thereupon dropped down onto the lower conveyor line at a desired lateral position along the width of the lower conveyor line.

9. The method of claim 1 further comprising operating the upper conveyor line to convey a second glass sheet along the first upper path of substrate travel, and thereafter operating the upper conveyor line to convey the second glass sheet along the second upper path of substrate travel, the second glass sheet being conveyed along the second upper path of substrate travel until reaching the drop region of the upper conveyor line whereupon the second glass sheet is dropped from the upper conveyor line downwardly onto the lower conveyor line so as to be positioned in a side-by-side pair with the first glass sheet.

10. The method of claim 9 further comprising operating the upper conveyor line to convey a third glass sheet along the first upper path of substrate travel, and thereafter operating the upper conveyor line to convey the third glass sheet along the second upper path of substrate travel, the third glass sheet being conveyed along the second upper path of substrate travel until reaching the drop region of the upper conveyor line whereupon the third glass sheet is dropped from the upper conveyor line downwardly onto the lower conveyor line so as to be positioned in a front-to-back pair with the first glass sheet, the second glass sheet, or both.

11. The method of claim 1 further comprising operating the upper conveyor line to convey a second glass sheet along the first upper path of substrate travel, and thereafter operating the upper conveyor line to convey the second glass sheet along the second upper path of substrate travel, the second glass sheet being conveyed along the second upper path of substrate travel until reaching the drop region of the upper conveyor line whereupon the second glass sheet is dropped from the upper conveyor line downwardly onto the lower conveyor line so as to be positioned in a front-to-back pair with the first glass sheet.

12. The method of claim 11 further comprising operating the upper conveyor line to convey a third glass sheet along the first upper path of substrate travel, and thereafter operating the upper conveyor line to convey the third glass sheet along the second upper path of substrate travel, the first and second upper paths of substrate travel being crosswise to each other, the third glass sheet being conveyed along the second upper path of substrate travel until reaching the drop region of the upper conveyor line whereupon the third glass sheet is dropped from the upper conveyor line downwardly onto the lower conveyor line so as to be positioned in a side-by-side pair with the first glass sheet, the second glass sheet, or both.

13. The method of claim 1 further comprising operating the upper conveyor line to convey a second glass sheet along the first upper path of substrate travel, and thereafter operating the upper conveyor line to convey the second glass sheet along the second upper path of substrate travel, the second glass sheet being conveyed along the second upper path of substrate travel until reaching the drop region of the upper conveyor line whereupon the second glass sheet is dropped from the upper conveyor line downwardly onto the lower conveyor line so as to be positioned in a diagonal pair with the first glass sheet.

14. The method of claim 1 comprising operating the drop batch builder so as to drop a plurality of glass sheets from the upper conveyor line downwardly onto the lower conveyor line so as to organize such glass sheets in a first batch arrangement on the lower conveyor line.

15. The method of claim 14 further comprising operating the drop batch builder so as to drop another plurality of glass sheets from the upper conveyor line downwardly onto the lower conveyor line so as to organize those glass sheets in a second batch arrangement on the lower conveyor line, the first batch arrangement being different from the second batch arrangement.

16. The method of claim 15 wherein the first and second batch arrangements each comprises at least three glass sheets, and the second batch arrangement includes at least one glass sheet that has a different size and/or shape than any glass sheet of the first batch arrangement.

17. The method of claim 16 wherein the first and second batch arrangements each comprises at least four glass sheets, and the second batch arrangement includes at least two glass sheets that each have a different size and/or shape than any glass sheet of the first batch arrangement.

18. A drop batch builder comprising:
an upper conveyor line; and
a lower conveyor line, the upper conveyor line being configured to convey glass sheets along a first upper path of substrate travel, the upper conveyor line also being configured to convey glass sheets along a second upper path of substrate travel, the first and second upper paths of substrate travel being crosswise to each other and each being generally horizontal, the lower conveyor line being configured to convey glass sheets along a lower path of substrate travel, the lower path of substrate travel being crosswise to the first upper path of substrate travel, the upper conveyor line being at a higher elevation than the lower conveyor line, the lower conveyor line passing under the upper conveyor line at an overpass region, the upper conveyor having a drop region configured to drop a first glass sheet from the upper conveyor line downwardly onto the lower conveyor line whereupon the lower conveyor line is configured to convey the first glass sheet along the lower path of substrate travel to the overpass region where the first glass sheet is positioned under the upper conveyor line, the first upper path of substrate travel being parallel to a width of the lower conveyor line and perpendicular to the lower path of substrate travel, the upper conveyor line being configured to convey glass sheets both forwardly and backwardly along the first upper path of substrate travel such that a desired glass sheet is first conveyed to a desired lateral position on the upper conveyor line, the upper conveyor line also being configured to convey the desired glass sheet at the desired lateral position along the second upper path of substrate travel to the drop region such that the desired glass sheet is thereupon dropped down onto the lower conveyor line at a desired position along the width of the lower conveyor line.

19. The drop batch builder of claim 18 further comprising a plurality of glass sheets organized in a batch arrangement on the lower conveyor line at the overpass region so as to be located under the upper conveyor line.

20. The drop batch builder of claim 18 wherein the upper and lower conveyor lines are configured such that when the first glass sheet is dropped from the upper conveyor line downwardly onto the lower conveyor line the first glass sheet lands in a horizontal position on the lower conveyor line.

21. The drop batch builder of claim 18 wherein the lower conveyor line is perpendicular to the upper conveyor line.

22. The drop batch builder of claim 18 wherein the lower path of substrate travel extends from a landing region, downstream to the overpass region, and further downstream to an egress region, the landing region being a region of the lower conveyor line where glass sheets dropped from the drop region of the upper conveyor line are received on the lower conveyor line, the overpass region being a region where glass sheets are conveyed along the lower conveyor line so as to pass beneath the upper conveyor line, the egress region being a region of the lower conveyor line where glass sheets are conveyed away from the upper conveyor line.

23. The drop batch builder of claim 18 wherein the lower path of substrate travel includes a landing region, the overpass region, and an egress region, and the drop batch builder further comprises a plurality of glass sheets organized in a batch arrangement on the egress region of the lower conveyor line, the batch arrangement including first and second glass sheets, the first glass sheet being different from the second glass sheet in terms of size, shape, or both.

24. The drop batch builder of claim 23 wherein the batch arrangement further includes a third glass sheet, the first glass sheet being different from the third glass sheet in terms of size, shape, or both, and the second glass sheet being different from the third glass sheet in terms of size, shape, or both.

25. The drop batch builder of claim 18 further comprising a glass tempering furnace, the glass tempering furnace being downstream from the lower conveyor line and positioned to receive glass sheets that are conveyed along the lower conveyor line and to the glass tempering furnace.

26. The drop batch builder of claim 25 further comprising a glass seaming station, the glass seaming station being upstream from the upper conveyor line, the upper conveyor line positioned to receive glass sheets that are conveyed from the glass seaming station and to the upper conveyor line.

27. The drop batch builder of claim 18 further comprising a ramp oriented at an acute angle relative to a horizontal plane and positioned such that glass sheets dropped from the drop region of the upper conveyor line slide down the ramp onto the lower conveyor line.

28. The drop batch builder of claim 27 wherein the lower conveyor line has a width, and the ramp is elongated so as to extend at least substantially entirely along the width of the lower conveyor line.

29. A method of using a drop batch builder having an upper conveyor line and a lower conveyor line, the upper conveyor line being at a higher elevation than the lower conveyor line, the lower conveyor line passing under the upper conveyor line at an overpass region, the method comprising:
operating the upper conveyor line to convey a first glass sheet along a first upper path of substrate travel, and thereafter operating the upper conveyor line to convey the first glass sheet along a second upper path of substrate travel until reaching a drop region of the upper conveyor line whereupon the first glass sheet is dropped from the upper conveyor line downwardly onto the lower conveyor line by sliding down a ramp onto the lower conveyor line;
wherein the first and second upper paths of substrate travel are crosswise to each other and wherein the ramp is oriented at an acute angle relative to a horizontal axis, the lower conveyor line has a width, and the ramp is elongated so as to extend at least substantially entirely along the width of the lower conveyor line.

30. The method of claim 29 further comprising operating the lower conveyor line to convey the first glass sheet along a lower path of substrate travel to the overpass region where the first glass sheet passes under the upper conveyor line.

31. A method of using a drop batch builder having an upper conveyor line and a lower conveyor line, the upper conveyor line being at a higher elevation than the lower conveyor line, the lower conveyor line passing under the upper conveyor line at an overpass region, the method comprising:
operating the upper conveyor line to convey a first glass sheet along a first upper path of substrate travel, and thereafter operating the upper conveyor line to convey the first glass sheet along a second upper path of substrate travel until reaching a drop region of the upper conveyor line whereupon the first glass sheet is dropped from the upper conveyor line downwardly onto the lower conveyor line;

wherein the first and second upper paths of substrate travel are crosswise to each other and wherein the upper conveyor line comprises both a set of transport rollers and a set of conveyor belts, wherein said conveying the first glass sheet along the first upper path of substrate travel comprises operating the conveyor belts, and wherein said conveying the first glass sheet along the second upper path of substrate travel comprises operating the transport rollers.

32. The method of claim 31 wherein the set of transport rollers has a raised configuration and a lowered configuration, the transport rollers when in the lowered configuration have upper surfaces at lower elevation than upper surfaces of the conveyor belts, the transport rollers when in the raised configuration have upper surfaces at higher elevation than upper surfaces of the conveyor belts, the method further comprising maintaining the transport rollers in the lowered configuration while operating the conveyor belts, thereafter moving the transport rollers to the raised configuration, and maintaining the transport rollers in the raised configuration while operating the transport rollers.

33. The method of claim 32 wherein the set of transport rollers is mounted to a pivotal frame, the method further comprising pivoting the frame so as to move the transport rollers from the lowered configuration to the raised configuration.

34. The method of claim 31 further comprising operating the lower conveyor line to convey the first glass sheet along a lower path of substrate travel to the overpass region where the first glass sheet passes under the upper conveyor line.

35. The method of claim 31 wherein the set of conveyor belts are in supportive contact with the first glass sheet during said conveying the first glass sheet along the first upper path of substrate travel.

36. A drop batch builder comprising:
an upper conveyor line; and
a lower conveyor line, the upper conveyor line being configured to convey glass sheets along a first upper path of substrate travel, the upper conveyor line also being configured to convey glass sheets along a second upper path of substrate travel, the first and second upper paths of substrate travel being crosswise to each other and each being generally horizontal, the lower conveyor line being configured to convey glass sheets along a lower path of substrate travel, the lower path of substrate travel being crosswise to the first upper path of substrate travel, the upper conveyor line being at a higher elevation than the lower conveyor line, the lower conveyor line passing under the upper conveyor line at an overpass region, the upper conveyor having a drop region configured to drop a first glass sheet from the upper conveyor line downwardly onto the lower conveyor line whereupon the lower conveyor line is configured to convey the first glass sheet along the lower path of substrate travel to the overpass region where the first glass sheet is positioned under the upper conveyor line, the upper conveyor line comprising both a set of transport rollers and a set of conveyor belts, the conveyor belts configured to convey glass sheets along the first upper path of substrate travel, the transport rollers configured to convey glass sheets along the second upper path of substrate travel, the set of transport rollers having a raised configuration and a lowered configuration, the transport rollers when in the lowered configuration have upper surfaces at a lower elevation than upper surfaces of the conveyor belts, the transport rollers when in the raised configuration have upper surfaces at a higher elevation than upper surfaces of the conveyor belts.

37. The drop batch builder of claim 36 wherein the set of transport rollers is mounted to a pivotal frame, the frame being pivotal between a raised position and a lowered position such that when the pivotal frame is in the raised position the transport rollers are in the raised configuration and when the pivotal frame is in the lowered position the transport rollers are in the lowered configuration.

38. The drop batch builder of claim 36 wherein the lower conveyor line has a landing region with conveyor belts but not transport rollers.

39. The drop batch builder of claim 36 wherein the set of conveyor belts are configured to be in supportive contact with the first glass sheet when the transport rollers are in the lowered configuration.

* * * * *